(12) United States Patent
Kim et al.

(10) Patent No.: US 11,494,162 B2
(45) Date of Patent: Nov. 8, 2022

(54) DISPLAY APPARATUS AND AUDIO OUTPUTTING METHOD

(71) Applicant: SAMSUNG ELECTRONICS CO., LTD., Suwon-si (KR)

(72) Inventors: Ki-Beom Kim, Suwon-si (JP); Sun Min Kim, Suwon-si (KR); Jae Youn Cho, Suwon-si (KR); In Woo Hwang, Suwon-si (KR); Ki Woong Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 139 days.

(21) Appl. No.: 16/770,422

(22) PCT Filed: Nov. 1, 2018

(86) PCT No.: PCT/KR2018/013208
§ 371 (c)(1),
(2) Date: Jun. 5, 2020

(87) PCT Pub. No.: WO2019/112182
PCT Pub. Date: Jun. 13, 2019

(65) Prior Publication Data
US 2021/0182017 A1    Jun. 17, 2021

(30) Foreign Application Priority Data
Dec. 5, 2017 (KR) .................. 10-2017-0165665

(51) Int. Cl.
*G06F 3/16* (2006.01)
*G06F 1/16* (2006.01)

(52) U.S. Cl.
CPC ............ *G06F 3/167* (2013.01); *G06F 1/1605* (2013.01); *G06F 3/162* (2013.01)

(58) Field of Classification Search
CPC ......... G06F 3/167; G06F 1/1605; G06F 3/162
(Continued)

(56) References Cited

U.S. PATENT DOCUMENTS 9,679,258 B2     6/2017   Mnih et al.
10,241,749 B1 *  3/2019   VanBlon .............. H04R 29/001
2008/0153537 A1* 6/2008   Khawand ................ H03G 3/32
                                                        455/550.1
(Continued)

FOREIGN PATENT DOCUMENTS

KR    10-2000-0013063 A     3/2000
KR    10-2014-0120573 A    10/2014
(Continued)

OTHER PUBLICATIONS

International Search Report (PCT/ISA/210) dated Feb. 28, 2019 by the International Searching Authority in counterpart International Patent Application No. PCT/KR2018/013208.
(Continued)

*Primary Examiner* — Stephen S Hong
*Assistant Examiner* — Broderick C Anderson
(74) *Attorney, Agent, or Firm* — Sughrue Mion, PLLC

(57) ABSTRACT

A display apparatus includes a user inputter receiving a user input; a content receiver receiving content data from a content source; a display configured to display an image included in the content data; a sound output configured to output sound included in the content data; and a processor configured to decode the content data into sound data, set a sound parameter according to a result of reinforcement learning about the sound parameter based on the user input, convert the sound data into a sound signal according to the set sound parameter, and control the sound output to output the sound corresponding to the sound signal.

14 Claims, 13 Drawing Sheets

(58) Field of Classification Search
USPC .......................................................... 715/728
See application file for complete search history.

(56) References Cited

U.S. PATENT DOCUMENTS

| | | | | |
|---|---|---|---|---|
| 2011/0095875 | A1* | 4/2011 | Thyssen | G09G 5/10 340/407.1 |
| 2014/0068661 | A1* | 3/2014 | Gates, III | H04N 21/441 725/34 |
| 2016/0065160 | A1* | 3/2016 | Choi | G06F 16/68 381/107 |
| 2016/0149547 | A1* | 5/2016 | Rider | H03G 3/3005 381/57 |
| 2017/0094434 | A1* | 3/2017 | Bhogal | H04S 7/303 |
| 2017/0103327 | A1* | 4/2017 | Penilla | G06Q 30/0207 |
| 2017/0155369 | A1* | 6/2017 | Wang | G10L 25/51 |
| 2017/0187866 | A1* | 6/2017 | Li | G06F 3/04883 |
| 2019/0272477 | A1* | 9/2019 | Ide | G06N 99/00 |
| 2020/0023856 | A1* | 1/2020 | Kim | G10L 17/00 |

FOREIGN PATENT DOCUMENTS

| | | | |
|---|---|---|---|
| KR | 10-2015-0018195 | A | 2/2015 |
| KR | 10-2015-0115302 | A | 10/2015 |
| KR | 10-2015-0131896 | A | 11/2015 |
| KR | 10-2016-0071129 | A | 6/2016 |

OTHER PUBLICATIONS

Written Opinion (PCT/ISA/237) dated Feb. 28, 2019 by the International Searching Authority in counterpart International Patent Application No. PCT/KR2018/013208.
Communication dated Jul. 8, 2020 from the European Patent Office in application No. 18886455.7.
Communication dated Aug. 23, 2021 issued by the European Patent Office in application No. 18886455.7.
Communication dated Nov. 18, 2021 issued by the Korean Patent Office in application No. 10-2017-0165665.

* cited by examiner (a)

(b)

(a)

(b)

(a)

(b)

DISPLAY APPARATUS AND AUDIO OUTPUTTING METHOD

TECHNICAL FIELD

Embodiments of the disclosure relate to a display apparatus and an audio outputting method, more specifically to a display apparatus and an audio outputting method controlling an audio output according to a user input and content audio characteristics.

BACKGROUND ART

In general, a display apparatus is an output device that visually displays received or stored image information to a user, and is used in various home-based or business fields. For example, as a display apparatus, a monitor device connected to a personal computer or a server computer, a portable computer device, a navigation terminal device, a general television device, an Internet Protocol television (IPTV) device, a smartphone, a portable terminal device such as a tablet PC, a personal digital assistant (PDA), or a cellular phone, various display devices are used to play images such as advertisements or movies in an industrial field, or various other types of audio/video systems.

The display apparatus can also receive content from various content sources, such as broadcast stations, Internet servers, video playback devices, game devices, and/or portable terminals. In addition, the display apparatus may restore (or decode) an image and audio from the content, and output the restored image and sound.

Recently, research on audio processing as well as image processing of the display apparatus has been actively conducted, and custom (adaptive) sound processing technology has been developed according to user preferences and sound characteristics of contents.

DISCLOSURE

Technical Problem

One aspect provides a display apparatus and an audio output method capable of controlling audio output according to user preferences and sound characteristics of contents.

One aspect provides a display apparatus and an audio output method capable of audio processing using reinforcement learning.

One aspect provides a display apparatus and an audio output method capable of controlling an audio mode and audio volume without a user input.

Technical Solution

In accordance with an aspect of the disclosure, a display apparatus includes a user inputter configured to receive a user input; a content receiver configured to receive content data from a content source; a display configured to display an image included in the content data; a sound output configured to output sound included in the content data; and a processor configured to decode the content data into sound data, set a sound parameter according to a result of reinforcement learning about the sound parameter based on the user input, convert the sound data into a sound signal according to the set sound parameter, and control the sound output to output the sound corresponding to the sound signal.

The processor may set the sound parameter based on environment information, and change the sound parameter according to an acquired reward by the user input.

When the user input is input related to the sound after outputting the sound, the processor may process a first reward acquired by the user input, and when the user input is not input related to the sound for a predetermined time after outputting the sound, the processor may process a second reward acquired by the user input, and wherein the second reward is greater than the first reward.

The processor may predict the reward by changing the sound parameter using the reinforcement learning, and change the sound parameter to a value at which the predicted reward becomes the maximum.

The processor may change the sound parameter immediately after the user input is input through the user inputter.

The processor may change the user parameter immediately after the display apparatus is turned on.

The user parameter may include a sound volume value, and the processor may set the sound volume value based on sound characteristics of the contents, and may change the sound volume value according to an acquired reward by the user input.

The processor may predict the reward by changing the sound volume value using the reinforcement learning, and may change the sound volume value to a value at which the predicted reward becomes the maximum.

The sound parameter may include an amplification rate of voice and an amplification rate of a background sound for sound rendering, and the processor may set the amplification rate of the background sound based on sound characteristics of the content, and may change the amplification rate of the background sound and the amplification rate of the voice according to a reward obtained by the user input.

The processor may predict the reward by the change of the amplification rate of the voice and the change of the amplification rate of the background sound, and may change the amplification rate of the voice and the amplification rate of the background sound to a value at which the predicted reward becomes the maximum.

In accordance with an aspect of the disclosure, an audio output method may comprise: receiving content from content sources; generating sound data by decoding the content; setting a sound parameter; changing the sound parameter according to reinforcement learning related to the sound parameter based on a user input; converting the sound data into a sound signal according to the changed sound parameter; and outputting sound corresponding to the sound signal.

The changing the sound parameter may include changing the sound parameter according to an acquired reward by the user input.

The reward may include a first reward acquired by the user input when the user input is input related to the sound after outputting the sound, the processor processes the first reward acquired by the user input, and a second reward acquired by the user input when the user input is not input related to the sound for a predetermined time after outputting the sound, and the second reward may be greater than the first reward.

The changing the sound parameter may comprise predicting the reward by changing the sound parameter using the reinforcement learning; and changing the sound parameter to a value at which the predicted reward becomes the maximum.

The changing the sound parameter may include changing the sound parameter immediately after the user input is inputted.

The changing the sound parameter may include changing the sound parameter immediately after a display apparatus is turned on.

The sound parameter may include a sound volume value. Also, setting the sound volume value may include setting the sound volume value based on sound characteristics of the content, and changing the sound volume value according to the acquired reward by the user input.

The changing the sound parameter may include predicting the reward by changing the sound volume value using the reinforcement learning, and changing the sound volume value to a value at which the predicted reward becomes the maximum.

The sound parameter may include an amplification rate of voice and an amplification rate of a background sound for sound rendering, and setting the sound parameter may include setting the amplification rate of the background sound based on the sound characteristics of the content, and changing the amplification rate of the background sound and the amplification rate of the voice according to the reward obtained by the user input.

The changing the sound parameter may include predicting the reward by the change of the amplification rate of the voice and the change of the amplification rate of the background sound, and changing the amplification rate of the voice and the amplification rate of the background sound to a value at which the predicted reward becomes the maximum.

Advantageous Effects

According to a display apparatus and an audio output method, it is possible to control an audio output according to user preferences and sound characteristics of contents.

According to a display apparatus and an audio output method, it is possible to control an audio process using reinforcement learning.

According to a display apparatus and an audio output method, it is possible to control an audio mode and audio volume without a user input.

MODE FOR INVENTION

Figure 1:
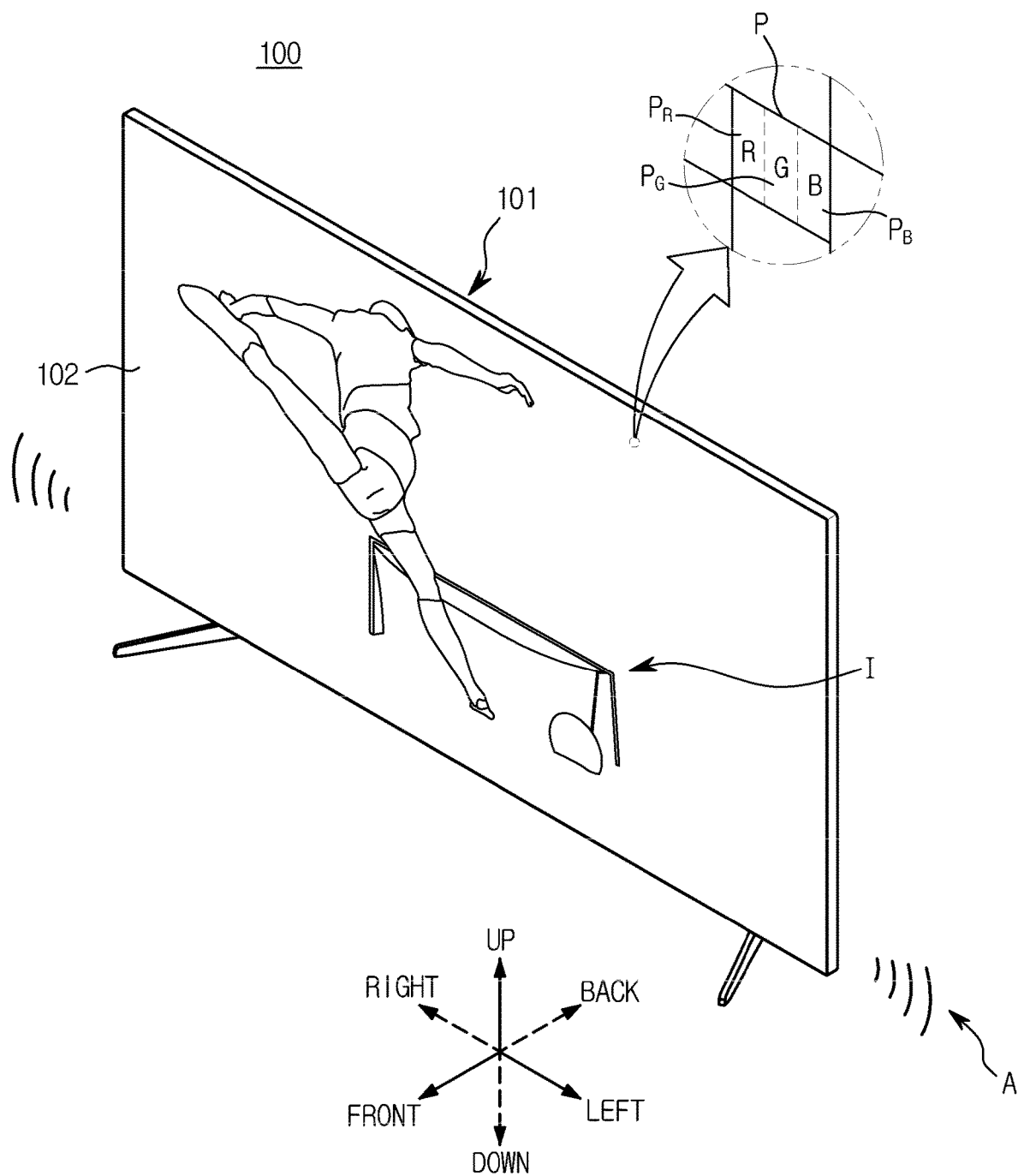
FIG. 1 is a view illustrating an appearance of a display apparatus according to an embodiment of the present disclosure.

In the following description, like reference numerals refer to like elements throughout the specification. This specification does not describe all elements of the embodiments, and in the technical field to which the present invention pertains, there is no overlap between the general contents or the embodiments. Terms such as "unit," "module," "member," and "block" may be embodied as hardware or software. According to embodiments, a plurality of "units," "modules," "members," or "blocks" may be implemented as a single component or a single "unit," "module," "member," or "block" may include a plurality of components.

In all specifications, it will be understood that when an element is referred to as being "connected" to another element, it can be directly or indirectly connected to the other element, wherein the indirect connection includes "connection via a wireless communication network."

Also, when a part "includes" or "comprises" an element, unless there is a particular description contrary thereto, the part may further include other elements, not excluding the other elements.

Throughout the specification, when one member is positioned "on" another member, this includes not only the case where one member abuts another member, but also the case where another member exists between the two members.

The terms first, second, etc. are used to distinguish one component from another component, and the component is not limited by the terms described above.

An expression used in the singular form encompasses the expression of the plural form, unless it has a clearly different meaning in the context.

The reference numerals used in operations are used for descriptive convenience and are not intended to describe the order of operations and the operations may be performed in an order different unless otherwise stated.

Hereinafter, embodiments of the present disclosure will be described with reference to the accompanying drawings.

FIG. 1 is a view illustrating an appearance of a display apparatus according to an embodiment of the present disclosure.

A display apparatus 100 is a device capable of processing an image signal received from the outside and visually displaying the processed image. For example, the display apparatus 100 may be implemented in various forms such as a monitor, a portable multimedia device, a portable communication device, and a portable computing device. If the display apparatus 100 is a device that visually reproduces an image signal and acoustically reproduces an audio signal, its form is not limited.

In addition, the display apparatus 100 may be a large display apparatus (Large Format Display, LFD) installed outdoors, such as a roof of a building or a bus stop. Here, the outdoors is not necessarily limited to the outdoors, and the display apparatus 100 according to an embodiment may be installed in a subway station, a shopping mall, a movie-theater, a company, a shop, etc., wherever a large number of people can enter or exit.

The display apparatus 100 may receive a video signal and an audio signal from various content sources, and output video and audio corresponding to the video signal and the audio signal. For example, the display apparatus 100 may receive television broadcast content through a broadcast receiving antenna or a wired cable, receive content from a content playback device, or receive content from a content providing server of a content provider.

The display apparatus 100 may learn sound processing according to a user's preference using reinforcement learning, and process sound data based on the learning result. For example, the display apparatus 100 learns sound processing based on a user input and environment information such as sound characteristics of content, sound mode, sound volume, external noise, and viewing time, and it is possible to provide sound tailored to the user's taste in response to the changing environment information. The display apparatus 100 is intended to finally allow the user to view content without input regarding an audio input.

As shown in FIG. 1, the display apparatus 100 includes a main body 101 accommodating a plurality of parts for displaying an image, and a screen 102 provided on one side of the main body 101 to display an image I.

The main body 101 forms an external shape of the display apparatus 100, and a component for the display apparatus 100 to display the image I may be provided inside the main body 101. The main body 101 shown in FIG. 1 is a flat plate shape, but the shape of the main body 101 is not limited to that shown in FIG. 1. For example, the main body 101 may be curved such that both right and left ends protrude forward and the center is concave.

The screen 102 is formed on the front surface of the main body 101, and the image I as visual information may be displayed on the screen 102. For example, a still image or a video may be displayed on the screen 102, and a 2D flat image or a 3D stereoscopic image may be displayed.

A plurality of pixels P are formed on the screen 102, and the image I displayed on the screen 102 may be formed by a combination of light emitted from the plurality of pixels P. For example, the light emitted by the plurality of pixels P may be combined as a mosaic to form the single image I on the screen 102.

Each of the plurality of pixels P may emit light of various brightness and various colors.

In order to emit light of various brightness, each of the plurality of pixels P may include a configuration (for example, an organic light emitting diode) capable of directly emitting light, or include a configuration (for example, a liquid crystal panel) capable of transmitting or blocking light emitted by a backlight unit or the like.

In order to emit light of various colors, each of the plurality of pixels P may include sub-pixels $P_R$, $P_G$, and $P_B$. The sub-pixels $P_R$, $P_G$, and $P_B$ include the red sub-pixel $P_R$ that can emit red light, the green sub-pixel $P_G$ that can emit green light, and the blue sub-pixel $P_B$ that can emit blue light. For example, the red light may represent light at a wavelength of approximately 620 nm (nanometer, 1 billionth of a meter) to 750 nm, the green light may represent light at a wavelength of approximately 495 nm to 570 nm, and the blue light may represent light from approximately 450 nm to 495 nm.

By combining the red light of the red sub-pixel $P_R$, the green light of the green sub-pixel $P_G$ and the blue light of the blue sub-pixel $P_B$, each of the plurality of pixels P emits light of various brightness and various colors.

The screen 102 shown in FIG. 1 is a flat plate shape, but the shape of the screen 102 is not limited to that shown in FIG. 1. For example, the screen 102 may have a shape in which both right and left ends protrude forward and the center portion is concave.

In addition, a speaker capable of outputting sound A may be provided on the back or side of the main body 101. The speaker may output the sound A included in the content received by the content source from the display apparatus 100.

Figure 2:
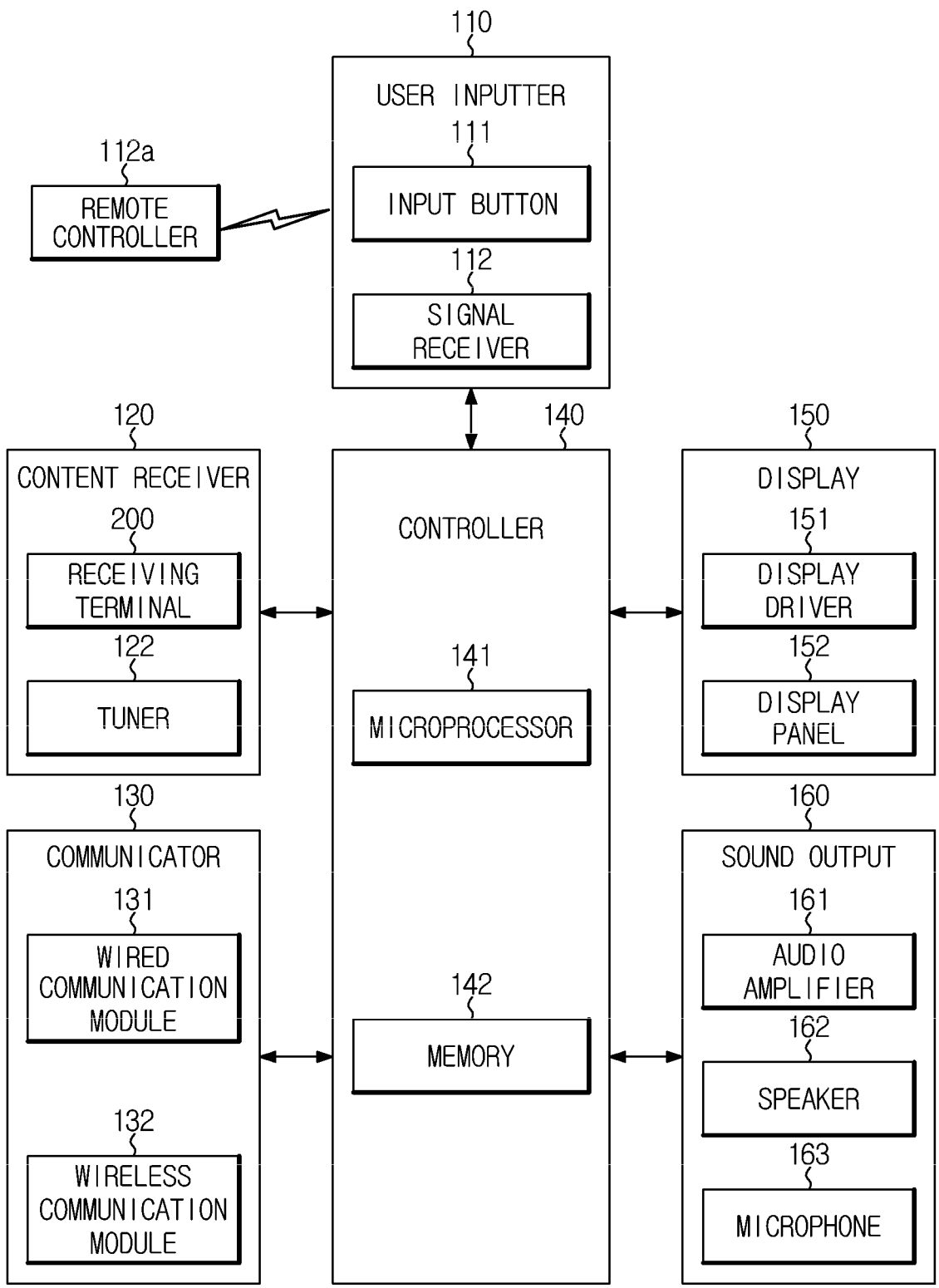
FIG. 2 is a view illustrating a configuration of a display apparatus according to an embodiment.

FIG. 2 is a view illustrating a configuration of a display apparatus according to an embodiment.

The display apparatus 100 includes a user inputter 110 for receiving the user input from the user, a content receiver 120 for receiving video/audio content from a content source, a communicator 130 which communicates with content sources, a controller 140 for processing the video/audio content received by the content receiver 120 and/or the communicator 130, a display 150 that displays an image processed by the controller 140, and a sound output 160 for outputting sound processed by the controller 140.

The user inputter 110 may include an input button 111 for receiving the user input. For example, the user inputter 110 may include a power button for turning on or off the display apparatus 100, a channel selection button for selecting broadcast content displayed on the display apparatus 100, a sound control button for adjusting the sound volume output by the display apparatus 100, and a source selection button for selecting a content source.

Each of the input buttons 111 may receive the user input and output an electrical signal corresponding to the user input to the controller 140, and it can be implemented by various input means such as a push switch, a touch switch, a dial, a slide switch, and a toggle switch.

The user inputter 110 also includes a signal receiver 112 that receives a remote control signal from a remote controller 112a. The remote controller 112a receiving the user input may be provided separately from the display apparatus 100, and may receive the user input and transmit a wireless signal corresponding to the user input to the display apparatus 100. The signal receiver 112 may receive the wireless signal corresponding to the user input from the remote controller 112a, and output an electrical signal corresponding to the user input to the controller 140.

The content receiver 120 includes a receiving terminal 121 that receives video/audio content including video data and audio data from a content source, and a tuner 122 that receives a broadcast signal including television broadcast content and tunes the received broadcast signal.

The receiving terminal 121 may be connected to a content source through a cable, and may receive video/audio content including image data and sound data from the content source. The video/audio content is received in the form of a data stream, and the video/audio content in the data stream (hereinafter referred to as "content data") may be generated by encoding the image data and sound data.

The receiving terminal 121 may include a component (YPbPr/RGB) terminal and a composite (composite video blanking and sync, CVBS) terminal for receiving analog video frame data. The receiving terminal 121 may include a high definition multimedia interface (HDMI) terminal for receiving digital image frame data. The receiving terminal 121 may also include a universal serial bus (USB) terminal for receiving image data from an external storage medium (e.g., a USB drive).

The tuner 122 may receive a broadcast signal from a broadcast reception antenna or a wired cable, and extract a broadcast signal of a channel selected by the user from among the broadcast signals. For example, the tuner 122 passes a television broadcast signal having a frequency corresponding to a channel selected by the user among television broadcast signals of various frequencies received through a broadcast reception antenna 2, and cuts off television broadcast signals having different frequencies. The television broadcast signal may be generated by modulating a data stream of content, and the display apparatus 100 may generate content data by demodulating the television broadcast signal.

As such, the content receiver 120 may receive video/audio content from a content source, and may output the video/audio content to the controller 140.

The communicator 130 may exchange data with a content source and/or external device through a communication network. For example, the communicator 130 may receive video/audio content from a content source or receive information about the video/audio content from an external device. The information about the video/audio content is information about the content itself, and may include the title of the content, the type of the content, and the genre of the content.

At this time, the communication network may include both wired and wireless communication networks. The wired communication network includes a communication network such as a cable network or a telephone network, and the wireless communication network may include a communication network that transmits and receives signals through radio waves. The wireless communication network may also include an access point (AP), and the access point may be wirelessly connected to the display apparatus 100 and wired to the wired communication network.

The communicator 130 may include a wired communication module 131 for exchanging data wirelessly with a content source and/or external device, and a wireless communication module 132 for exchanging data wirelessly with a content source and/or external device.

The wired communication module 131 may connect to the wired communication network and communicate with a content source through the wired communication network. For example, the wired communication module 131 may access the wired communication network through Ethernet (Ethernet, IEEE 802.3 technology standard), and receive data from a content source and/or external device through the wired communication network.

The wireless communication module 132 may communicate wirelessly with a base station or access point (AP), and may access the wireless communication network through the base station or access point. The wireless communication module 132 may also communicate with a content source and/or external device connected to the wireless communication network through the base station or access point. For example, the wireless communication module 132 wirelessly communicates with the access point (AP) using Wi-Fi (WiFi™, IEEE 802.11 technology standard), or CDMA, WCDMA, GSM, Long Term Evolution (LTE), WiBro, etc. to communicate with the base station. The wireless communication module 132 may also receive data from a content source and/or external device via the base station or access point.

In addition, the wireless communication module 132 may directly communicate wirelessly with a content source and/or external device. For example, the wireless communication module 132 uses Wi-Fi, Bluetooth™ (IEEE 802.15.1 technology standard), ZigBee™ (IEEE 802.15.4 technology standard), and the like to receive data from content sources and/or external devices wirelessly.

As such, the communicator 130 may receive video/audio content and/or video/audio content information from a content source and/or external device through the wired communication module 131 and/or the wireless communication module 132. The video/audio content and/or video/audio content information received through the wired communication module 131 and/or the wireless communication module 132 may be output to the controller 140.

The controller 140 may control the content receiver 120, the communicator 130, the display 150 and/or the sound output 160 according to the user input received through the user inputter 110. For example, when the user input for selecting a content source is received, the controller 140 may control the content receiver 120 and/or the communicator 130 to receive the content data from the selected content source. In addition, when the user input for image adjustment and/or sound adjustment is received, the controller 140 may control the display 150 and/or the sound output 160 to adjust the video and/or sound.

The controller 140 may process image data and/or audio data received by the content receiver 120 and/or the communicator 130. For example, the controller 140 may restore the image data by decoding the content data, and output the restored image data to the display 150. In addition, the controller 140 may decode the content data to restore the sound data, and process the sound data to generate an analog sound signal (hereinafter referred to as 'sound signal').

In particular, the controller 140 may process sound data using reinforcement learning. For example, the controller 140 learns processing of the sound data based on the user input and the environment information such as the sound characteristics of the content, sound mode, sound volume, external noise, and viewing time, and processes the sound data according to the learning result.

The controller 140 may include a microprocessor 141 and a memory 142.

The memory 142 may store programs and data for controlling components included in the display apparatus 100, and temporarily store content data issued while controlling the components included in the display apparatus 100.

In addition, the memory 142 stores programs and data for decoding the content data received by the content receiver 120 and/or the communicator 130, and temporarily stores the image data and/or sound data issued while decoding the content data.

The memory 142 may include a non-volatile memory such as ROM (Read Only Memory), flash memory for storing data for a long period of time, and a volatile memory such as static random access memory (S-RAM) and dynamic random access memory (D-RAM) for temporarily storing data.

The microprocessor 141 may receive the user input from the user inputter 110. A microprocessor 231 may generate a control signal for controlling the content receiver 120, the communicator 130, the display 150 and/or the sound output 160 according to the user input.

The microprocessor 141 may receive content data from the content receiver 120 and/or the communicator 130. The microprocessor 141 may decode the content data according to programs and data stored in the memory 142 and restore image data and sound data.

In addition, the microprocessor 141 learns processing of the sound data based on the user input and the environment information such as the sound characteristics of the content, sound mode, sound volume, external noise, and viewing time, and analog sound signals may be generated by processing the sound data according to the learning result.

The microprocessor 231 may include an operation circuit that performs logical operations and arithmetic operations, and a memory circuit that stores the calculated data.

The display 150 includes a display panel 152 for visually displaying an image, and a display driver 151 for driving the display panel 152.

The display panel 152 may include a pixel that is a unit for displaying an image. Each pixel may receive an electrical signal representing an image from the display driver 151 and output an optical signal corresponding to the received electrical signal. As such, one image may be displayed on the display panel 152 by combining optical signals output from a plurality of pixels.

For example, the display panel 152 is provided with a plurality of pixels, and an image displayed on the display panel 152 may be formed by a combination of light emitted from the plurality of pixels. For example, one image may be formed on the display panel 152 by combining light emitted by a plurality of pixels as a mosaic. As described above, each of the plurality of pixels may emit light of various brightness and various colors. In order to emit light of various colors, each of the plurality of pixels may include the red sub-pixel, the green sub-pixel, and the blue sub-pixel.

The display panel 152 may be implemented by a panel which includes various types such as a liquid crystal display panel (LCD panel), a light emitting diode panel (LED panel), or an organic light emitting diode panel (OLED panel).

The display driver 151 may drive the display panel 152 to receive image data from the controller 140 and display an image corresponding to the received image data. Specifically, the display driver 151 may transmit an electrical signal corresponding to the image data to each of a plurality of pixels constituting the display panel 152.

When the display driver 151 transmits an electrical signal corresponding to the image data to each pixel constituting the display panel 152, each pixel outputs light corresponding to the received electrical signal, and the light output from each pixel can be combined to form a single image.

The sound output 160 includes an audio amplifier 161 for amplifying sound, a speaker 162 for acoustically outputting the amplified sound, and a microphone 163 for collecting ambient sound.

The controller 140 may process the sound data and convert it to a sound signal, and the audio amplifier 161 may amplify the sound signal output from the controller 140.

The speaker 162 may convert the sound signal amplified by the audio amplifier 161 into sound (sound wave). For example, the speaker 162 may include a thin film that vibrates according to an electrical sound signal, and sound waves may be generated by the vibration of the thin film.

The microphone 163 may collect ambient sound of the display apparatus 100 and convert the collected sound into an electrical sound signal. The sound signal collected by the microphone 163 may be output to the controller 140.

As described above, the display apparatus 100 may receive content including video and audio from various content sources, and output the video and audio included in the content. In addition, the display apparatus 100 may learn sound processing according to the user's preference using reinforcement learning, and process sound data based on the learning result.

Hereinafter, the sound processing of the display apparatus 100 using reinforcement learning is described.

Figure 3:
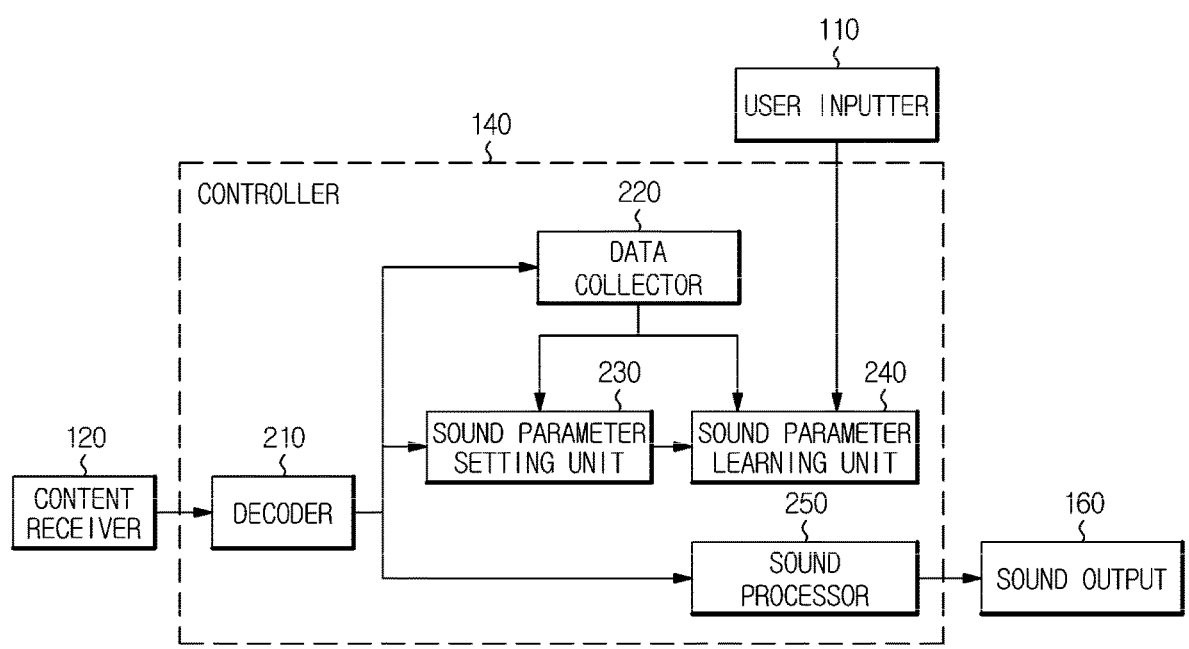
FIG. 3 illustrates an example of a controller included in a display apparatus according to an embodiment.
Figure 4:
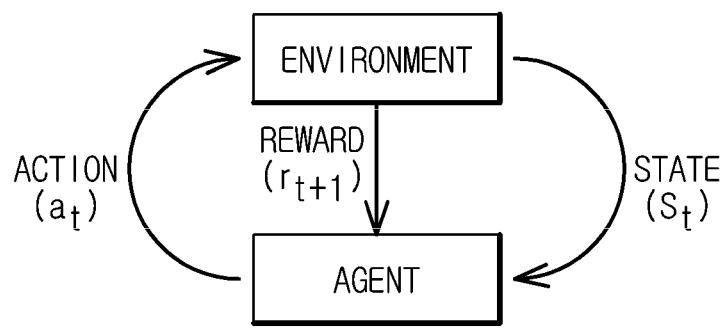
FIGS. 4 and 5 are views for explaining reinforcement learning.
Figure 5:
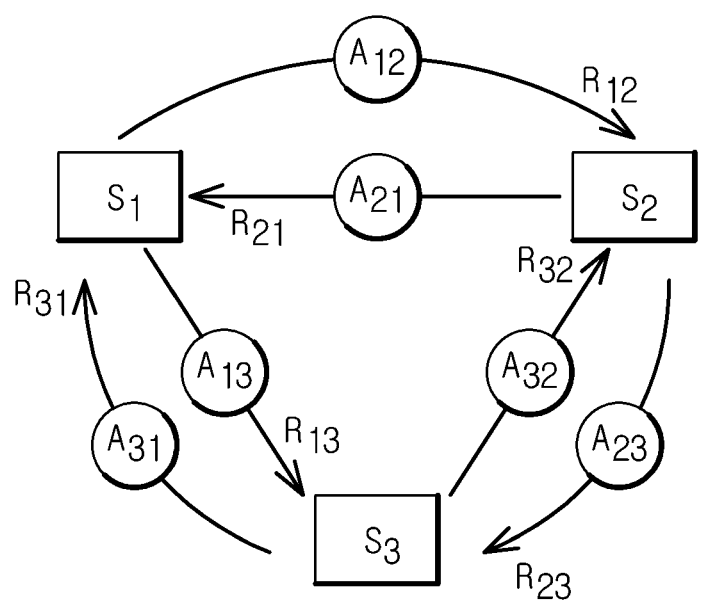
Figure 6:
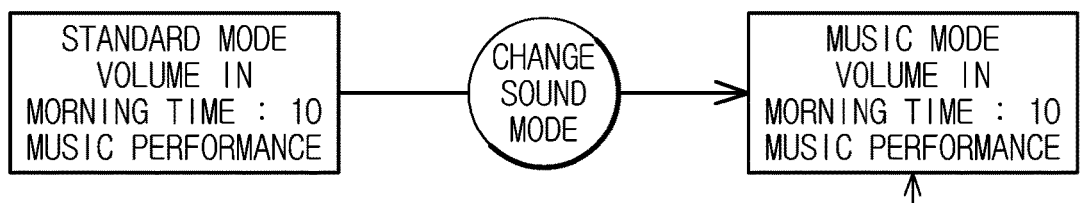
FIGS. 6, 7 and 8 are views for explaining reinforcement learning of a display apparatus according to an embodiment.
Figure 6:
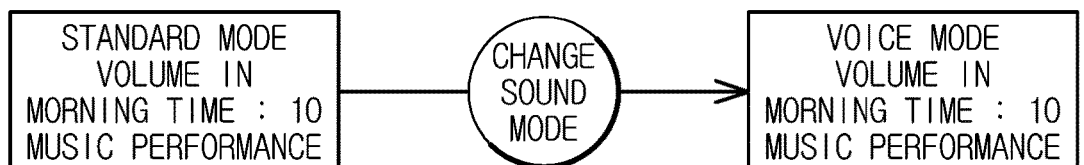
Figure 7:
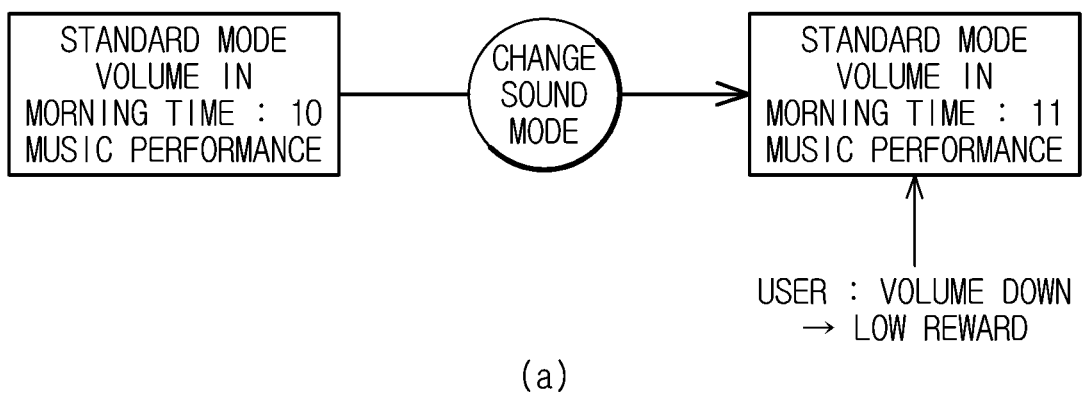
Figure 7:
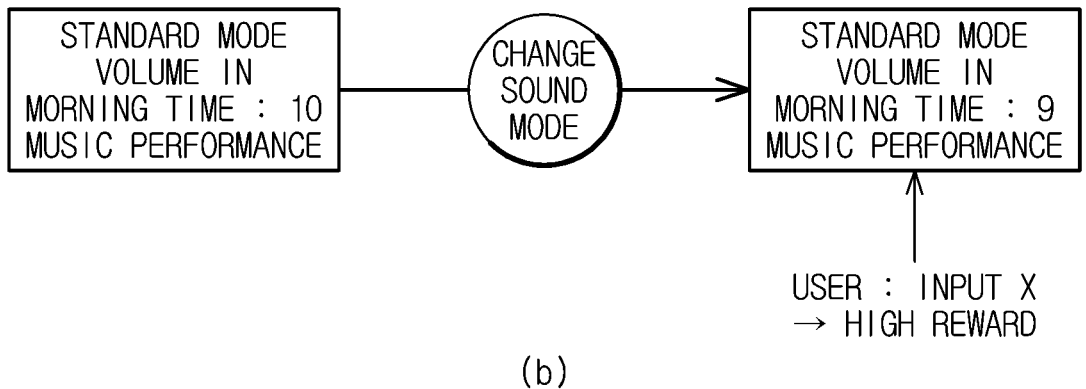
Figure 8:
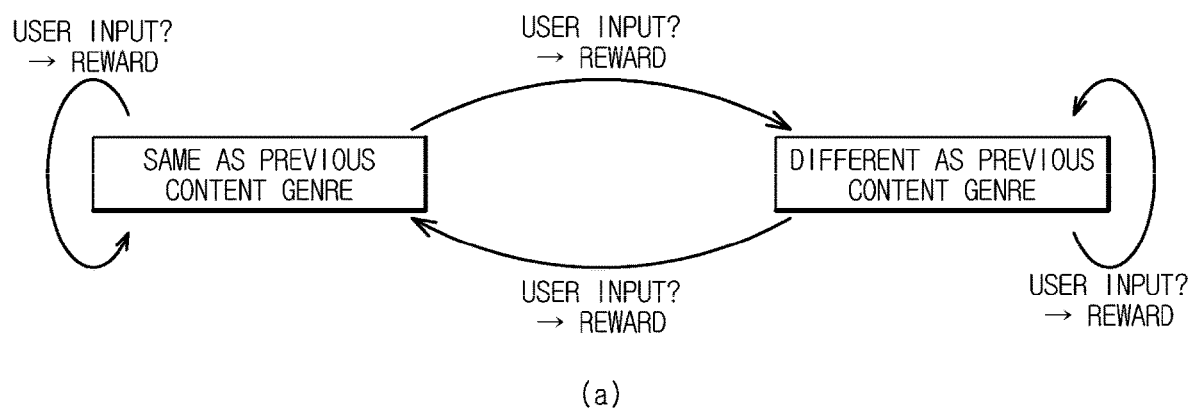

FIG. 3 illustrates an example of a controller included in a display apparatus according to an embodiment. FIGS. 4 and 5 are views for explaining reinforcement learning. FIGS. 6, 7 and 8 are views for explaining reinforcement learning of a display apparatus according to an embodiment.

Referring to FIGS. 3, 4, 5, 6, 7, and 8, the controller 140 receives the user input from the user inputter 110, and receives the content data from the content receiver 120. The controller 140 may process the content data and generate a sound signal using reinforcement learning. In addition, the controller 140 may output the sound signal generated from the content data to the sound output 160.

The controller 140 includes a decoder 210, a data collector 220, a sound parameter setting unit 230, a sound parameter learning unit 240, and a sound processor 250. The decoder 210, the data collector 220, the sound parameter setting unit 230, the sound parameter learning unit 240, and the sound processor 250 are respectively stored in the memory 142 and executed by the microprocessor 141 (software) or a digital circuit (hardware) mounted inside the microprocessor 141.

The decoder 210 may decode content data to restore image data and sound data. The content data may be compressed/encoded according to various compression/encoding standards. For example, video data among content data is compressed using video compression standards such as H.264/MPEG-4 Moving Picture Experts Group-4 Advanced Video Coding (AVC) and H.265/HEVC (High Efficiency Video Coding). The sound data may be compressed/encoded using sound compression standards such as Advanced Audio Coding (AAC) and MPEG-H 3D Audio.

The decoder 210 may restore image data from content data using an image compression standard, and restore sound data from the content data using an audio compression standard.

In addition, the decoder 210 may output sound data to the data collector 220, the sound parameter setting unit 230, and the sound processor 250.

The data collector 220 can collect the environment information for reinforcement learning. For example, the data collector 220 may collect the sound characteristics of the content, sound mode, sound volume, external noise, current time and viewing time, and the like.

The data collector 220 can determine the sound characteristics of the content. The sound characteristics of the content may depend on the genre of the content. The genre of the content may include news, drama, entertainment, sports, documentaries, movies, comedy, music, and the like.

The data collector 220 may analyze metadata related to the content to determine the genre of the content. Metadata is attribute information of the content and may include various information describing the content, such as the location of the content, information about the author, and information about the genre. Therefore, when the metadata of the content data is received together with the content data, the data collector 220 may analyze the metadata to determine the genre of the content. In addition, the data collector 220 can determine the sound characteristics of the content based on the genre of the content.

The data collector 220 may analyze the sound data of the content itself to determine the genre of the content and/or the genre of the sound. For example, the data collector 220 may determine the genre of the content and/or the genre of the sound using a genre recognition model. The genre recognition model may be generated in advance through machine learning based on a plurality of training sound data. Also, the data collector 220 may determine the genre of the content and/or the genre of the sound based on the sound data of a part of the content.

The data collector 220 can determine the currently set sound mode. The sound mode may indicate an operation mode of the display apparatus 100 related to sound processing. Depending on the sound mode, a sound amplification rate for each frequency band and a sound amplification rate of voice and background sound may be different.

The display apparatus 100 may receive a selection of the sound mode from the user through the user inputter 110. The sound parameter setting unit 230 can output sound parameters according to different sound modes, and the sound processor 250 may generate sound signals by processing sound data using different sound parameters according to different sound modes.

For example, in a standard mode, the sound processor 250 may apply the same amplification factor to all frequency bands, the same amplification factor to foreground and background sounds, and the same amplification factor to the voice and background sounds. In a music mode, the sound processor 250 may apply a different amplification factor to the frequency band according to the genre of music, and set the amplification factor of the background sound higher than the amplification factor of the voice. In a voice mode, the sound processor 250 applies the same amplification factor to all frequency bands, and may set the voice amplification factor higher than that of the background sound. In addition, in an automatic mode, the sound processor 250 may apply different amplification factors to the frequency bands according to the genre of the content, and different amplification factors to the voice and background sounds according to the genre of the content.

As described above, the sound processor 250 may operate in various sound modes according to the user input, and the data collector 220 may collect information regarding the sound mode of the sound processor 250 based on the user input.

The data collector 220 may determine the sound volume based on the user input through the user inputter 110. For example, the sound volume may be determined based on the user input through a volume up button or a volume down button provided on the input button 111 or the remote controller 112*a*.

The data collection unit 220 may determine external noise around the display device 100 based on the sound signal collected through the microphone 163. For example, the data collection unit 220 may determine a magnitude of the external noise based on a magnitude of the sound signal collected through the microphone 163.

The data collector 220 may determine the current time and the user's viewing time based on the output of a timer included in the controller 140. The controller 140 may receive information about the current time from an external device through the communicator 130, or may calculate the current time using the timer based on the user's time setting.

The environment information collected by the data collector 220 is limited to that described above, and the data collector 220 may collect additional information in addition to those described above.

The sound parameter setting unit 230 may receive sound data from the decoder 210 and the environment information from the data collector 220. The sound parameter setting unit 230 may generate sound parameters for sound processing based on the sound data and the environment information. Here, the sound parameters may include a sound amplification factor for each frequency band, a sound amplification factor of voice/background sound, and a sound volume. Also, the sound parameter setting unit 230 may output the generated sound parameters to the sound parameter learning unit 240.

For example, the sound parameter setting unit 230 may generate sound parameters according to the sound mode. The sound parameter setting unit 230 may generate a sound parameter including the sound amplification rate for each frequency band, the sound amplification rate of voice/background sound, and a sound volume according to the sound mode. The sound parameter setting unit 230 may store preset sound parameters corresponding to the sound mode, and output the sound parameters corresponding to the current sound mode to the sound parameter learning unit 240. In particular, in the automatic mode, the sound parameter setting unit 230 may generate different sound parameters according to the sound characteristics of the content. The sound parameter setting unit 230 may store the preset sound parameters corresponding to the sound characteristics of the content, and may output the sound parameters corresponding to the sound characteristics of the current content to the sound parameter learning unit 240.

As such, the sound parameter setting unit 230 may store preset sound parameters in response to various environment information. In addition, the sound parameter setting unit 230 may output the sound parameters corresponding to the current environment information to the sound parameter learning unit 240.

The sound parameter setting unit 230 outputs a sound parameter stored in advance according to the environment information. The sound parameter stored in advance is not changed unless the software of the display apparatus 100 is updated. Therefore, the sound parameter output from the sound parameter setting unit 230 may not reflect the user's taste or propensity.

The sound parameter learning unit 240 may receive the sound parameters from the sound parameter setting unit 230, receive the environment information from the data collector 220, and receive the user input from the user inputter 110.

The sound parameter learning unit 240 may learn about the sound parameters based on the environment information and the user input. In addition, the sound parameter learning unit 240 may modify the sound parameter based on the learning result, and output the modified sound parameter to the sound processor 250. In particular, the sound parameter learning unit 240 can learn about the sound parameters and modify the sound parameters so that the user input related to the sound is minimized.

The sound parameter learning unit 240 may learn about the sound parameters based on the environment information and the user input using reinforcement learning.

Reinforcement learning is a type of machine learning that learns based on rewards for actions.

Machine learning can largely be classified into supervised learning, unsupervised learning, and reinforcement learning.

Supervised learning means that a designer or a user provides a label (correct answer) for data to train a learning device (e.g., computer, microprocessor, etc.), and unsupervised learning means that the learning device classifies and learns data by itself without the intervention of a designer or a user.

Reinforcement learning is an intermediate learning method between supervised learning and unsupervised learning, and means that an agent (learning device) learns by performing an operation in a given environment and obtaining a reward from the environment.

As illustrated in FIG. 4, reinforcement learning is composed of an agent, an environment (or state), an action, and a reward.

Agent means a subject that acts and learns, and the display apparatus 100 or the sound parameter learning unit 240 may correspond to the agent of reinforcement learning.

Environment means a state given to the agent, and the environment information collected by the data collector 220 may correspond to the environment of reinforcement learning.

Action means an action performed by the agent in a given environment, and the sound parameter learning unit 240 may modify the sound parameter received from the sound parameter setting unit 230 to correspond to the action of reinforcement learning.

In addition, reward means the price given to the agent for the action. The user input input through the user inputter 110 may correspond to the reward of reinforcement learning.

In reinforcement learning, the agent can take a specific action in a given environment and get rewards from the environment. The agents can analyze the correlation between the environment and the action and the reward, and predict the reward for multiple actions in a given environment. Furthermore, the agent can take action to obtain the maximum reward in a given environment.

More specifically, the agent can determine a state $s_t$ and possible actions $A(s_t)$ based on the environment given at a time t. The agent may take action at any one of the actions $A(s_t)$. As a result, the environment is changed to a new state $s_t+1$, and the agent can acquire a reward $r_{t+1}$. These agents take action to maximize the cumulative rewards based on the interaction between the actions and the rewards in a given environment.

For example, as shown in FIG. 5, the agent may be placed in any one of state $S_1$, state $S_2$, and state $S_3$. In each state, the agent can take action $A_{12}$ and action $A_{13}$, action $A_{21}$ and action $A_{23}$, and action $A_{32}$ and action $A_{31}$, and the agent can obtain reward $R_{12}$ and reward $R_{13}$, reward $R_{21}$ and reward $R_{23}$, and reward $R_{32}$ and reward $R_{31}$.

When the agent takes the action $A_{12}$ in the state $S_1$, the state of the agent may be changed from the state $S_1$ to the state $S_2$, and the agent may obtain the reward $R_{12}$ in the state $S_2$. When the agent takes the action $A_{13}$ in the state $S_1$, the state of the agent may be changed from the state $S_1$ to the state $S_3$, and the agent may obtain the reward $R_{13}$ in the state $S_3$.

When the agent takes the action $A_{21}$ in the state $S_2$, the state of the agent may be changed from the state $S_2$ to the state $S_1$, and the agent may obtain the reward $R_{21}$ in the state $S_1$. When the agent takes the action $A_{23}$ in the state $S_2$, the state of the agent may be changed from the state $S_2$ to the state $S_3$, and the agent may obtain the reward $R_{23}$ in the state $S_3$.

In addition, when the agent takes the action $A_{31}$ in the state $S_3$, the state of the agent may be changed from the state $S_3$ to the state $S_1$, and the agent may obtain the reward $R_{31}$ in the state $S_1$. When the agent takes the action $A_{32}$ in the state $S_3$, the state of the agent may be changed from the state $S_3$ to the state $S_2$, and the agent may obtain the reward $R_{32}$ in the state $S_2$.

As such, the agent can take various actions in a given state by the environment, and the state is converted by the action and the agent is rewarded.

The agent may have a policy function π as [Equation 1] to select an action in a given state by the environment.

$$\pi(S_t) = a_t \quad \text{[Equation 1]}$$

Here, π denotes a policy function, $s_t$ denotes the state at the time t, and $a_t$ denotes the agent action at the time t.

When the agent acts in a given environment, a reward such as [Equation 2] may be given.

$$r(s_t, a, s_{t+1}) = r_{t+1} \quad \text{[Equation 2]}$$

Here, r represents the reward function, $s_t$ denotes the state at the time t, $a_t$ denotes the agent's action at the time t, $s_{t+1}$ denotes the state at a time t+1, and $r_{t+1}$ denotes the reward given to the agent at the time t+1.

The agent's reward in the future may be given as [Equation 3].

$$R_t = r_{t+1} + \gamma r_{t+2} + \gamma^2 r_{t+3} + \ldots = \sum_{k=1}^{\infty} r_{t+k}. \quad \text{[Equation 3]}$$

Here, $R_t$ denotes the reward after the time duration t, $r_{t+1}$ denotes the reward given to the agent at the time t+1, and γ may denote a count factor between 0 and 1 to deduct future rewards.

The sound parameter learning unit 240 using reinforcement learning can take a specific action in a given environment and obtain a reward from the environment. For example, the sound parameter learning unit 240 can modify the sound parameter based on the given environment information and receive the user input from the user. Also, the sound parameter learning unit 240 may acquire the reward based on the user input.

The sound parameter learning unit 240 analyzes a correlation between the environment information (status), the sound parameters (action) and the user input (reward), and can predict the user input by the sound parameters from the given environment information. Furthermore, the sound parameter learning unit 240 may modify the sound parameters to obtain the maximum reward (minimum user input) from the given environment information.

The sound parameter learning unit 240 may take action at various viewpoints and/or various conditions.

The sound parameter learning unit 240 may take action in response to the user input so that the user does not recognize the change of the sound parameter. For example, when the user changes a broadcast channel or changes content, the sound parameter learning unit 240 may change the sound parameter set by the sound parameter setting unit 230.

For example, the display apparatus 100 can play a movie with a sound volume of 10 in the standard mode during the morning hours. At this time, the content played by the display apparatus 100 may be changed from a movie to a music performance by the user input.

The sound parameter learning unit 240 can receive the environment information including the sound characteristics of the content, sound mode, sound volume, external noise, and viewing time from the data collector 220, and the sound parameter learning unit 240 can determine the current state. In the current state, the sound parameter learning unit 240 can modify the sound parameters. Specifically, the sound parameter learning unit 240 may change the sound mode or the sound volume.

When the sound parameter learning unit 240 changes the sound mode or the sound volume, the environment information is changed and becomes a new state. In addition, the sound parameter learning unit 240 can receive the new environment information from the data collector 220.

As such, the user input reflects the user's preference or propensity by changing the sound volume, changing the sound mode, and the like, and if the user is satisfied with the changed sound volume or sound mode, the user does not input the user input regarding the volume, and if the user is not satisfied with the changed sound volume or sound mode, the user can enter the user input. In other words, the user input may indicate the user's sound satisfaction in a given environment, that is, the sound characteristics of the given content, sound mode, sound volume, external noise, and viewing time, and the reward may be given according to the user input.

When the user input regarding sound is received through the user inputter 110 in a new state, the sound parameter learning unit 240 may obtain a low reward, or the cumulative reward of the sound parameter learning unit 240 may be subtracted.

On the other hand, if the user input related to sound is not received through the user inputter 110 in the new state, the sound parameter learning unit 240 may acquire a high reward or increase the cumulative reward of the sound parameter learning unit 240.

When the sound parameter learning unit 240 changes the standard mode to the music mode as shown in (a) of FIG. 6, the user can feel satisfied with the music being played and maintain the sound mode. As described above, since the user input is not input by the action of the sound parameter learning unit 240 (changing the sound mode from the standard mode to the music mode), the sound parameter learning unit 240 can obtain a high reward.

When the sound parameter learning unit 240 changes the standard mode to the voice mode as shown in (b) of FIG. 6, the user may feel dissatisfied with the music being played and return the sound mode to the standard mode. As described above, since the user input is input by the action of the sound parameter learning unit 240 (changing the sound mode from the standard mode to the voice mode), the sound parameter learning unit 240 can obtain a low reward.

As a result of this learning, in order to obtain a high reward, the sound parameter learning unit 240 may generate a policy of changing the sound mode to the music mode in the state of playing a music performance with a sound volume of 10 in the standard mode in the morning time.

As shown in (a) of FIG. 7, when the sound parameter learning unit 240 increases the sound volume to 11, the user may input the user input for lowering the sound volume in consideration of the morning time. As described above, since the user input is input by the action of the sound parameter learning unit 240 (increasing the sound volume), the sound parameter learning unit 240 can obtain a low reward.

As shown in (b) of FIG. 7, when the sound parameter learning unit 240 lowers the sound volume to 9, the user can be satisfied with lowering the sound volume in consideration of the morning time. As described above, since the user input is not input by the action of the sound parameter learning unit 240 (turning down the sound volume), the sound parameter learning unit 240 can obtain a high reward.

As a result of this learning, in order to obtain a high reward, the sound parameter learning unit 240 may generate a policy of lowering the sound volume in the state of playing the music performance with the sound volume of 10 in the standard mode in the morning time.

The sound parameter learning unit 240 may change the set value of the sound parameter according to the generated policy, and output the sound parameter to the sound processor 250 based on the changed set value of the sound parameter.

In addition, the sound parameter learning unit 240 may take action in response to the turn-on of the display apparatus 100 so that the user does not recognize the change of the sound parameter. In addition, while the display apparatus 100 is operating in the on state, the sound parameter learning unit 240 may acquire the reward.

For example, when the display apparatus 100 is turned on by the user input in the off state, the sound parameter learning unit 240 may change the sound parameter of the sound parameter setting unit 230 based on the learning result. In addition, the sound parameter learning unit 240 may acquire the reward according to the user input input while the display apparatus 100 is operating.

After the display apparatus 100 is turned on, a plurality of contents may be sequentially played according to the passage of time. When the display apparatus 100 is turned on, the sound parameter learning unit 240 may determine a correction value of the sound parameter based on the learning result.

The sound parameter learning unit 240 may determine a state according to whether the content genre changes due to a change in the content. For example, as illustrated in (a) of FIG. 8, the state $S_1$ in which the content genre is changed and the state $S_2$ in which the content genre is not changed may be defined. The sound parameter learning unit 240 may determine the state of reinforcement learning according to whether the content genre is changed. When the genre of the content played by the display apparatus 100 is the same as the genre of the previous content, the sound parameter learning unit 240 determines that the state is $S_1$. When the genre of the content reproduced by the display apparatus 100 is different from the genre of the previous content, the sound parameter learning unit 240 may determine the state $S_2$.

The sound parameter setting unit 230 and the sound parameter learning unit 240 may set different sound parameters according to the content genre. For example, the sound parameter setting unit 230 and the sound parameter learning unit 240 may set different sound modes or different sound volumes according to the content genre.

Therefore, the sound parameter may be changed in the state $S_1$ in which the content genre is changed, and the sound parameter may not be changed in the state $S_2$ in which the content genre is not changed.

The user may input the user input such as a sound mode change and/or a sound volume change according to the content and sound, and the sound parameter learning unit 240 may obtain the reward according to the user input. For example, as illustrated in (b) of FIG. 8, when the sound mode is changed, the sound parameter learning unit 240 may acquire a reward of '−10,' and when the sound mode is maintained, the sound parameter learning unit 240 may acquire a reward of '+10.' In addition, when the sound volume is changed, the sound parameter learning unit 240 can obtain a reward of '−3,' and when the sound volume is maintained, the sound parameter learning unit 240 can obtain a reward of '+3.'

As described above, the sound parameter learning unit 240 may acquire the reward by the user input while the display apparatus 100 is turned on. Then, when the display apparatus 100 is turned off and then turned on again, the sound parameter learning unit 240 creates a policy for maximizing the reward based on the obtained reward. According to the created policy, the setting value of the sound parameter can be changed. Also, the sound parameter learning unit 240 may output the sound parameters to the sound processor 250 based on the set values of the changed sound parameters.

The sound processor 250 may receive sound data from the decoder 210 and receive the modified sound parameters from the sound parameter learning unit 240. The sound processor 250 may process the sound data according to the sound parameters and generate sound signals. Also, the sound processor 250 may output a sound signal to the sound output 160.

For example, the sound processor 250 may process sound data according to the sound volume received from the sound parameter learning unit 240. In other words, the sound processor 250 may adjust the strength of the sound signal according to the sound volume received from the sound parameter learning unit 240.

In addition, the sound processor 250 may distinguish the sound data from the voice and background sound, and amplify the voice and background sound at different amplification rates according to the sound mode received from the sound parameter learning unit 240. The sound processor 250 can amplify the voice and background sound at the same amplification rate in the standard mode, amplify the background sound at a higher amplification rate than the voice in the music mode, and amplify the voice at a higher amplification rate than the background sound in the voice mode. In the automatic mode, the sound processor 250 may amplify the voice and background sound according to the amplification rate received from the sound parameter learning unit 240, respectively.

As described above, the controller 140 can restore the sound data from the content data using the sound compression standard, and the sound characteristics of the content, sound mode, sound volume, external noise, current time and viewing time (time duration). The controller 140 may generate sound parameters for processing sound data, and may modify the sound parameters using reinforcement learning based on the environment information and the user input. In addition, the controller 140 may process the sound data according to the sound parameters modified by reinforcement learning, and generate sound signals.

As described above, by modifying the sound parameters using the reinforcement learning by the controller 140, the display apparatus 100 may provide an optimal sound that matches the surrounding environment such as the viewing time and external noise, and the user's taste/propensity.

Figure 9:
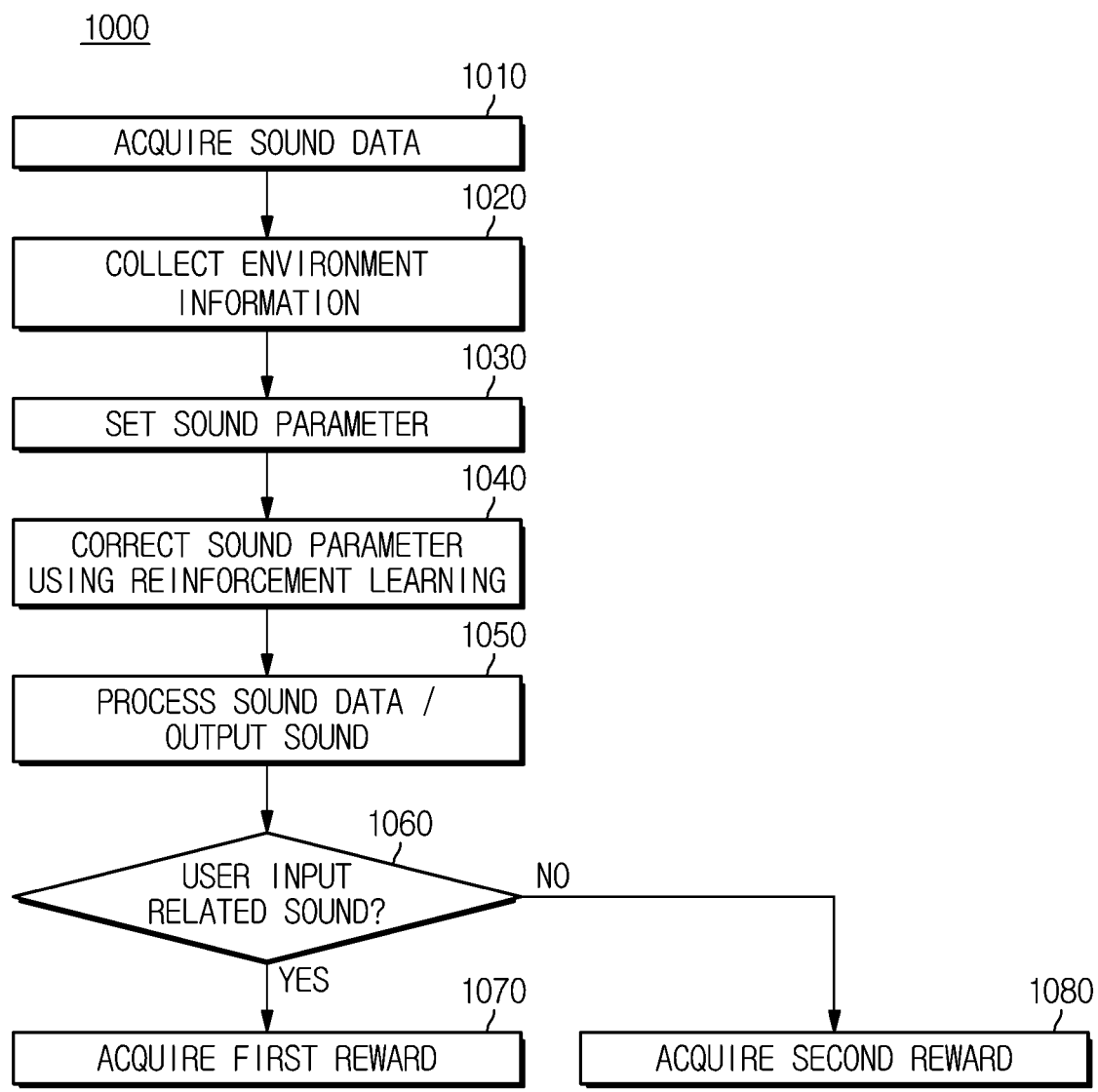
FIG. 9 shows a sound processing method of a display apparatus according to an embodiment.

FIG. 9 shows a sound processing method of a display apparatus according to an embodiment.

As shown in FIG. 9, a sound processing method 1000 of the display apparatus 100 is described.

The display apparatus 100 acquires sound data (1010).

The content receiver 120 and/or the communicator 130 may receive content data from a content source, and output the received content data to the controller 140.

The controller 140 may receive the content data from the content receiver 120 and/or the communicator 130, and decode the content data using the image compression standard and the sound compression standard to restore image data and sound data.

The display apparatus 100 collects environment information (1020).

The controller 140 may collect the environment information for reinforcement learning. For example, the controller 140 may collect the sound characteristics of the content, sound mode, sound volume, external noise, current time and viewing time.

Specifically, the controller 140 may determine the content genre and the sound characteristics based on the sound data and/or sound metadata, and determine the sound mode and sound volume based on the user input for selecting the sound mode and sound volume. In addition, the controller 140 may determine external noise based on the size of the sound signal collected through the microphone 163, and may determine the current time and the user's viewing time based on the output of the timer.

The display apparatus 100 sets sound parameters (1030).

The controller 140 may set the sound parameters based on the environment information. Here, the sound parameters may include the sound amplification rate and the volume of the voice/background sound. For example, the sound parameters may be set according to the sound mode. Specifically, the controller 140 may store preset sound parameters corresponding to the sound mode, and set the sound parameters corresponding to the sound characteristics of the current sound mode and/or the current content.

The display apparatus 100 modifies the sound parameters based on reinforcement learning (1040).

The controller 140 may learn about the sound parameters based on the environment information and the user input using reinforcement learning.

Specifically, the controller 140 can take a specific action in a given environment and obtain rewards from the environment. For example, the controller 140 may modify the sound parameters based on the given environment information, and receive the user input from the user. In addition, the controller 140 may obtain the reward based on the user input.

In addition, the controller 140 may analyze the correlation between the environment information and the sound parameters and the user input, and predict the user input, that is, the reward when modifying the sound parameters in the given environment information. Furthermore, the controller 140 may modify the sound parameters so as to obtain the maximum reward, or the minimum user input, from the given environment information.

The controller 140 can set and modify the sound parameters at various times. For example, the controller 140 sets and modifies the sound parameters in response to the user input (e.g., channel change, content change, etc.) so that the user does not recognize the change of the sound parameters, or the controller 140 can set and modify the sound parameters when the display apparatus 100 is turned on in the off state.

The display apparatus 100 processes sound data and outputs sound (1050).

The controller 140 processes the sound data according to sound parameters and generates sound signals. For example, the controller 140 may adjust the size of the sound signal according to the sound volume. In addition, the controller 140 may distinguish the sound data from the voice and background sound, and amplify the voice and background sound at different amplification rates according to the sound mode received from the sound parameter learning unit 240.

In addition, the controller 140 may output the sound signal to the sound output 160, and the sound output 160 may convert the sound signal to sound (sound wave).

The display apparatus 100 determines whether the user input related to the sound is received (1060).

The user can listen to the sound of the display apparatus 100 and input the user input to modify the sound mode and/or sound volume. The controller 140 may receive the user input for modifying the sound mode and/or sound volume through the user inputter 110.

When the user input is received (YES in 1060), the display apparatus 100 obtains a first reward in relation to reinforcement learning (1070).

Since the controller 140 is learned to minimize the user input related to sound, when the user input is received, the controller 140 may acquire a low reward (e.g., negative reward) or the cumulative reward of the controller 140 may be subtracted.

If the user input is not received (NO in 1060), the display apparatus 100 obtains a second reward in relation to reinforcement learning (1080).

Since the controller 140 is learned to minimize the user input related to sound, when the user input is received, the controller 140 may obtain a high reward (e.g., positive reward) or the cumulative reward of the controller 140 may be increased.

By acquiring different rewards depending on whether the user input is received, the controller 140 can process the sound data so that the user input is minimized.

As described above, the display apparatus 100 can learn about the processing of the sound data according to the user's taste or propensity using reinforcement learning, and process the sound data according to the user's taste or propensity according to the learning result.

Hereinafter, another example of reinforcement learning of the display apparatus will be described.

Figure 10:
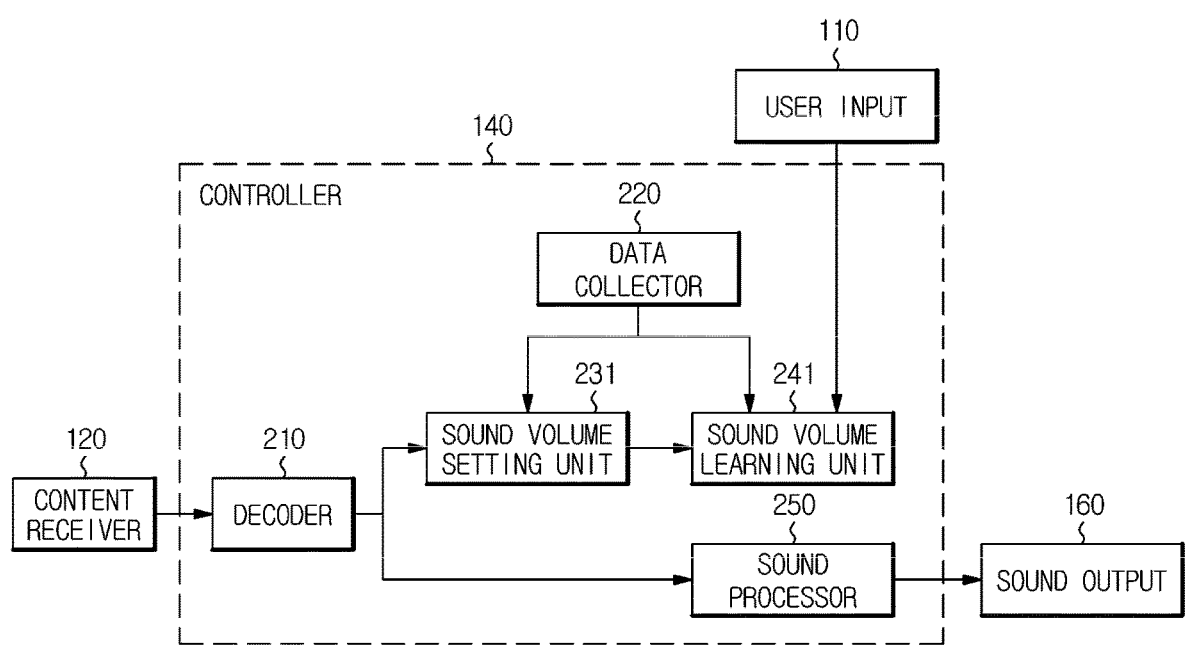
FIG. 10 shows another example of a controller included in a display apparatus according to an embodiment.
Figure 11:
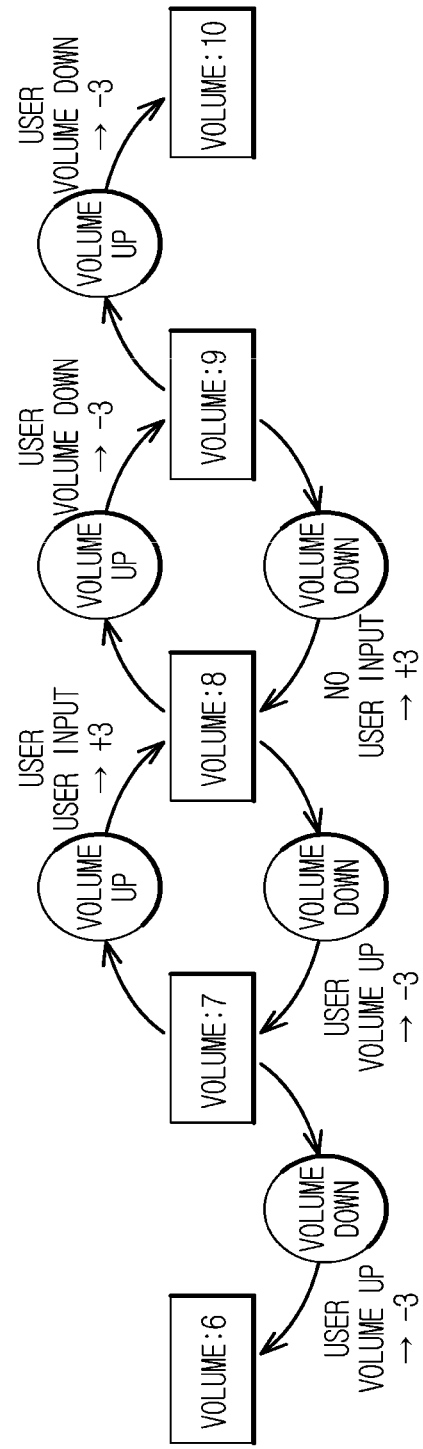
FIG. 11 is a view for explaining reinforcement learning of a display apparatus according to an embodiment.

FIG. 10 shows another example of a controller included in a display apparatus according to an embodiment. FIG. 11 is a view for explaining reinforcement learning of a display apparatus according to an embodiment.

Referring to FIGS. 10 and 11, the controller 140 includes the decoder 210, the data collector 220, a sound volume setting unit, a sound volume learning unit 241, and the sound processor 250. The decoder 210, the data collector 220, the sound volume setting unit 231, the sound volume learning unit 241, and the sound processor 250 are stored in the memory 142 respectively, and implemented by application (software) processing by the microprocessor 141, or implemented by a digital circuit (hardware) mounted inside the microprocessor 141.

The decoder 210 and the data collector 220 may be the same as those shown in FIG. 3.

The sound volume setting unit 231 may receive sound data from the decoder 210 and environment information from the data collector 220. The sound volume setting unit 231 may generate sound volume values based on the sound data and the environment information. For example, the sound volume setting unit 231 may generate the sound volume values according to the sound modes. Also, the sound volume setting unit 231 may output the generated sound volume value to the sound volume learning unit 241.

As described above, the sound volume setting unit 231 may store preset sound volume values in response to various environment information, and may output the sound volume values corresponding to the current environment information to the sound volume learning unit 241.

The sound volume learning unit 241 may receive the sound volume values from the sound volume setting unit 231, receive the environment information from the data collector 220, and receive the user input from the user inputter 110.

The sound volume learning unit 241 may learn about the sound volume values based on the environment information and the user input. In addition, the sound volume learning unit 241 may modify the sound volume value based on the learning result and output the modified sound volume value to the sound processor 250. In particular, the sound volume learning unit 241 can learn about the sound volume value and modify the sound volume value so that the user input regarding sound is minimized.

The sound volume learning unit 241 may use reinforcement learning to learn about the sound volume based on the environment information and the user input.

The sound volume learning unit 241 using reinforcement learning can take a specific action in a given environment and obtain a reward from the environment. For example, the sound volume learning unit 241 may modify the sound volume value based on the given environment information and receive the user input from the user. In addition, the sound volume learning unit 241 may acquire the reward by the user input.

The sound volume learning unit 241 analyzes a correlation between the environment information (state), the sound volume values (action) and the user input (reward), and can predict the user input based on the sound volume values from the given environment information. Furthermore, the sound volume learning unit 241 can modify the sound volume value to obtain the maximum reward (minimum user input) from the given environment information.

For example, as illustrated in FIG. 11, the sound volume learning unit 241 may modify the sound volume value to '6' while the sound volume is '7.' Thereafter, the display apparatus 100 may receive the user input for increasing the sound volume. The sound volume learning unit 241 may obtain the reward of '−3' by reducing the volume while the sound volume is '7.'

In the state that the sound volume is '7,' the sound volume learning unit 241 can modify the sound volume value to '8.' Thereafter, the display apparatus 100 may not receive the user input related to sound. The sound volume learning unit 241 may acquire the reward of '+3' by increasing the sound volume while the sound volume is '7.'

As a result of the above learning, the sound volume learning unit 241 may generate a policy of increasing the sound volume while the sound volume is '7' in order to maximize the reward.

Also, in the state in which the sound volume is '8,' the sound volume learning unit 241 may modify the sound volume value to '7.' Thereafter, the display apparatus 100 may receive the user input for increasing the sound volume. The sound volume learning unit 241 may acquire the reward of '−3' by reducing the volume while the sound volume is '8.'

In the state that the sound volume is '8,' the sound volume learning unit 241 can modify the sound volume value to '9.' Thereafter, the display apparatus 100 may receive the user input for reducing the sound volume. The sound volume learning unit 241 may acquire the reward of '−3' by increasing the volume while the sound volume is '8.'

As a result of the above learning, the sound volume learning unit 241 may generate a policy of maintaining the sound volume in a state where the sound volume is '8' in order to maximize the reward.

Also, in the state in which the sound volume is '9,' the sound volume learning unit 241 may modify the sound volume value to '8.' Thereafter, the display apparatus 100 may not receive the user input related to sound. The sound volume learning unit 241 may acquire the reward of '+3' by reducing the volume while the sound volume is '9.'

In the state that the sound volume is '9,' the sound volume learning unit 241 can modify the sound volume value to '10.' Thereafter, the display apparatus 100 may receive the user input for reducing the sound volume. The sound volume learning unit 241 may acquire the '−3' reward by increasing the volume while the sound volume is '9.'

As a result of the above learning, the sound volume learning unit 241 may generate a policy of reducing the sound volume while the sound volume is '9' in order to maximize the reward.

The sound volume learning unit 241 may change the setting value of the sound volume according to the generated policy, and output the sound volume value to the sound processor 250 based on the changed sound volume setting value.

The sound processor 250 may receive sound data from the decoder 210 and receive a modified sound volume value from the sound volume learning unit 241. The sound processor 250 may process the sound data according to the sound volume value and generate sound signals. Specifically, the sound processor 250 may control the strength of the sound signal according to the sound volume value. Also, the sound processor 250 may output an audio signal to the sound output 160.

As described above, the controller 140 may generate the sound volume value for processing the sound data, and may modify the sound volume value using reinforcement learning based on the environment information and the user input. In addition, the controller 140 may process the sound data according to the sound volume value corrected by reinforcement learning and generate sound signals.

Figure 12:
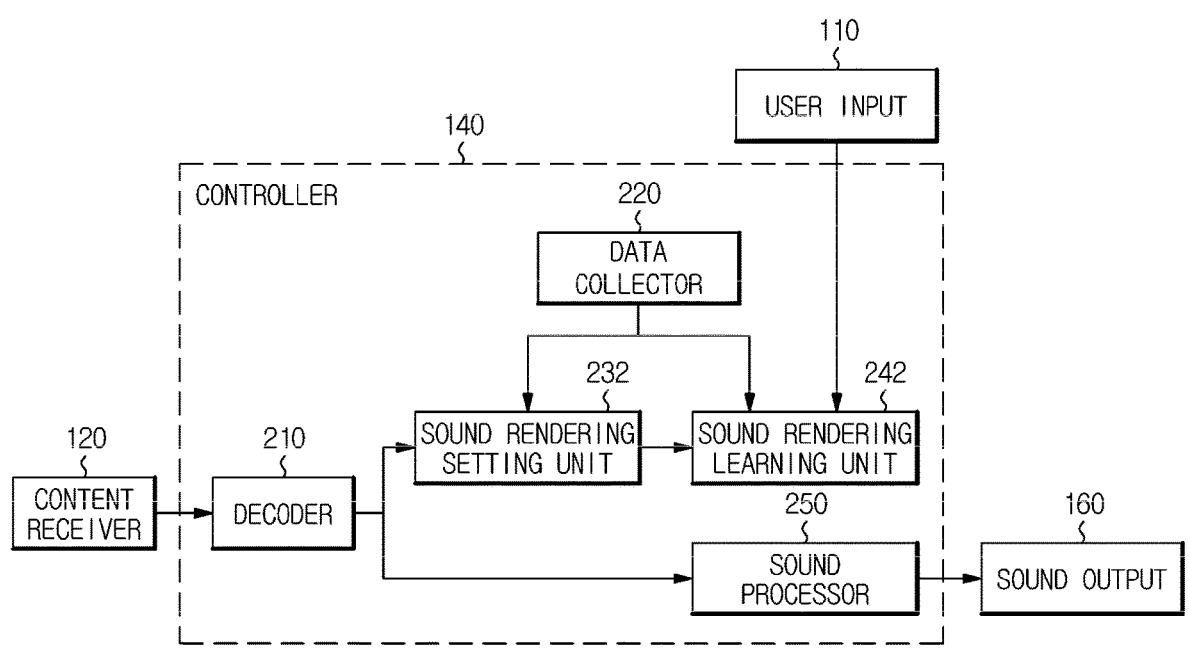
FIG. 12 shows another example of a controller included in a display apparatus according to an embodiment.
Figure 13:
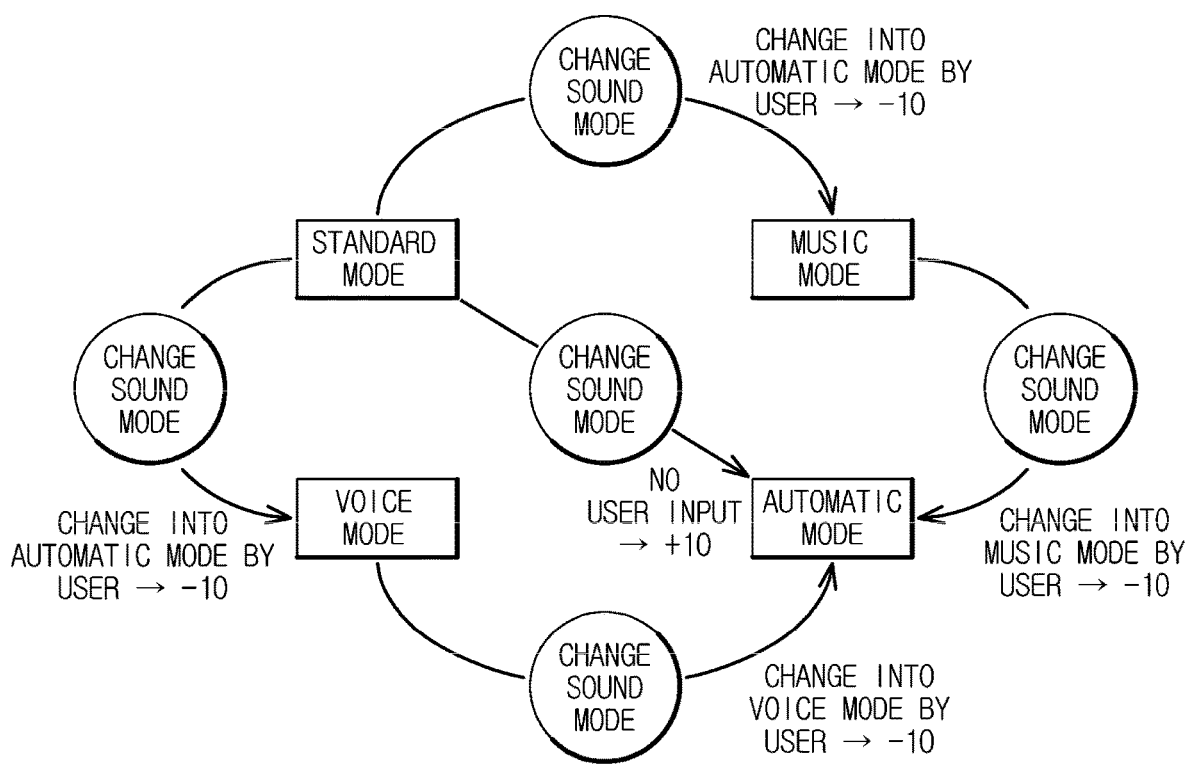
FIG. 13 is a view for explaining reinforcement learning of a display apparatus according to an embodiment.

As described above, by modifying the sound volume value using the reinforcement learning by the controller 140, the display apparatus 100 can provide an optimal sound that matches the surrounding environment such as the viewing time and external noise, and the user's taste/propensity FIG. 12 shows another example of a controller included in a display apparatus according to an embodiment. FIG. 13 is a view for explaining reinforcement learning of a display apparatus according to an embodiment.

Referring to FIGS. 12 and 13, the controller 140 includes the decoder 210, the data collector 220, a sound rendering setting unit 232, a sound rendering learning unit 242, and the sound processor 250. The decoder 210, the data collector 220, the sound rendering setting unit 232, the sound rendering learning unit 242, and the sound processor 250 are respectively stored in the memory 142 and executed by the microprocessor 141 (software), or a digital circuit (hardware) mounted inside the microprocessor 141.

The decoder 210 and the data collector 220 may be the same as those shown in FIG. 3.

The sound rendering setting unit 232 may receive sound data from the decoder 210 and environment information from the data collector 220. The sound rendering setting unit 232 can generate an amplification factor of voice/background sound based on the sound data and the environment information. For example, the sound rendering setting unit 232 may generate the amplification factor of the voice/background sound according to the sound mode. In addition, the sound rendering setting unit 232 may output the amplification factor of the generated voice/background sound to the sound rendering learning unit 242.

As described above, the sound rendering setting unit 232 may store a preset amplification factor of voice/background sound in response to various environment information, and output the amplification factor of the voice/background sound corresponding to the current environment information to the sound rendering learning unit 242.

The sound rendering learning unit 242 may receive the amplification rates of the voice/background sound from the sound rendering setting unit 232, receive the environment information from the data collector 220, and receive the user input from the user inputter 110.

The sound rendering learning unit 242 can learn about the amplification rates of the voice/background sound based on the environment information and the user input. In addition, the sound rendering learning unit 242 may modify the amplification factor of the voice/background sound based on the learning result, and output the modified voice/background sound amplification factor to the sound processor 250. In particular, the sound rendering learning unit 242 learns about the amplification factor of the voice/background sound, and can modify the amplification factor of the voice/background sound so that the user input regarding sound is minimized.

The sound rendering learning unit 242 can use reinforcement learning to learn about the amplification rates of the voice/background sound based on the environment information and the user input.

The sound rendering learning unit 242 using reinforcement learning can take a specific action in a given environment and obtain a reward from the environment. For example, the sound rendering learning unit 242 may modify the amplification factor of the voice/background sound based on the given environment information and receive the user input from the user. In addition, the sound rendering learning unit 242 may acquire the reward by the user input.

The sound rendering learning unit 242 analyzes the correlation between the environment information (state) and the amplification factor (action) of the voice/background sound and the user input (reward), and can predict the user input by the amplification factor of the voice/background sound in the given environment information. Furthermore, the sound rendering learning unit 242 can modify the amplification factor of the voice/background sound so as to obtain the maximum reward (minimum user input) from the given environment information.

For example, as illustrated in FIG. 13, in the state in which the sound mode is the 'standard mode,' the sound rendering learning unit 242 may change the sound mode to the 'music mode' in order to change the amplification factor of the voice/background sound. The amplification rate of the voice/background sound can be changed by changing the sound mode. Thereafter, the display apparatus 100 may receive the user input for changing the sound mode to the 'automatic mode.' The sound rendering learning unit 242 may obtain the reward of '−10' by modifying the sound mode from the 'standard mode' to the 'music mode.'

In the state in which the sound mode is the 'standard mode,' the sound rendering learning unit 242 may change the sound mode to the 'voice mode' in order to change the amplification factor of the voice/background sound. Thereafter, the display apparatus 100 may receive the user input for changing the sound mode to the 'automatic mode.' The sound rendering learning unit 242 can obtain the reward of '−10' by modifying the sound mode from the 'standard mode' to the 'voice mode.'

In the state in which the sound mode is the 'standard mode,' the sound rendering learning unit 242 may change the sound mode to the 'automatic mode' to change the amplification factor of the voice/background sound. Thereafter, the display apparatus 100 may not receive the user input related to sound. The sound rendering learning unit 242 can obtain the reward of '+10' by modifying the 'automatic mode' from the 'normal mode' of the sound mode.

As a result of the above learning, the sound volume learning unit 241 may generate a policy of changing the sound mode to the 'automatic mode' while the sound mode is the 'standard mode' in order to maximize the reward.

When the sound mode is the 'music mode,' the sound rendering learning unit 242 may change the sound mode to the 'automatic mode' to change the amplification factor of the voice/background sound. Thereafter, the display apparatus 100 may receive the user input that returns the sound mode to the 'music mode.' The sound rendering learning unit 242 can obtain the reward of '−10' by modifying the sound mode from the 'music mode' to the 'automatic mode.'

When the sound mode is the 'voice mode,' the sound rendering learning unit 242 may change the sound mode to the 'automatic mode' to change the amplification factor of the voice/background sound. Thereafter, the display apparatus 100 may receive the user input that returns the sound mode to the 'voice mode.' The sound rendering learning unit 242 can obtain the reward of '−10' by modifying the 'automatic mode' in the state in which the sound mode is the 'voice mode.'

As a result of the above learning, the sound volume learning unit 241 may generate a policy of not changing the sound mode in the state that the sound mode is the 'music mode' or the 'voice mode' in order to maximize the reward.

The sound volume learning unit 241 may change the setting value of the sound mode according to the generated policy, and output the amplification factor of the voice/background sound to the sound processor 250 based on the changed sound mode setting value.

The sound processor 250 may receive sound data from the decoder 210 and receive a modified voice/background amplification rate from the sound rendering learning unit 242. The sound processor 250 may process the sound data according to the amplification rate of the voice/background sound, and generate sound signals. Specifically, the sound processor 250 may separate the sound data into voice data and background sound data, and amplify the voice signal and the background sound signal according to the amplification factor of the voice/background sound. In addition, the sound processor 250 may output the generated sound signal to the sound output 160.

As described above, the controller 140 may generate the amplification factor of the voice/background sound for processing sound data, and may change the amplification factor of the voice/background sound using reinforcement learning based on the environment information and the user input. In addition, the controller 140 may process the sound data according to the amplification rate of the voice/background sound modified by reinforcement learning, and generate a sound signal.

As described above, by modifying the amplification factor of the voice/background sound using the reinforcement learning, the controller 140 can provide the optimal sound that matches the surrounding environment such as the viewing time and external noise, and the user's taste/propensity.

Meanwhile, the disclosed embodiments may be implemented in the form of a recording medium that stores instructions executable by a computer. The instructions may be stored in the form of a program code, and when executed by a processor, may generate program modules to perform operations of the disclosed embodiments. The recording medium may be embodied as a computer-readable recording medium.

The computer-readable recording medium includes all kinds of recording media storing instructions that can be read by a computer. For example, there may be read only memory (ROM), random access memory (RAM), a magnetic tape, a magnetic disk, flash memory, and an optical data storage device.

As described above, the disclosed embodiments have been described with reference to the accompanying drawings. Those of ordinary skill in the art to which the posted embodiments belong will understand that they may be practiced in different forms from the disclosed embodiments without changing the technical spirit or essential features of the posted embodiments. The disclosed embodiments are illustrative and should not be construed as limiting.

The invention claimed is:

1. A display apparatus, comprising:
   a user input interface;
   a content interface configured to receive content data from a content source;
   a display configured to display an image according to the content data;
   a sound output interface configured to output sound according to the content data; and
   a processor configured to decode the content data into sound data, set a sound parameter according to a result of reinforcement learning about the sound parameter, convert the sound data into a sound signal according to the set sound parameter, and control the sound output interface to output the sound corresponding to the sound signal,
   wherein the processor is configured to process a first reward when a user input to change the sound parameter is input through the user input interface after outputting the sound, and
   wherein the processor is configured to process a second reward which is greater than the first reward when the user input to change the sound parameter is not input for a predetermined time after outputting the sound.

2. The display apparatus of claim 1, wherein the processor is configured to set the sound parameter based on environment information, and change the sound parameter according to a reward corresponding to the first reward or the second reward.

3. The display apparatus of claim 2, wherein the processor is configured to change the sound parameter to a value at which a predicted reward is maximized.

4. The display apparatus of claim 2, wherein the processor is configured to change the sound parameter immediately after the user input is input through the user input interface.

5. The display apparatus of claim 2, wherein the processor is configured to change the sound parameter immediately after the display apparatus is turned on.

6. The display apparatus of claim 1, wherein the sound parameter indicates a sound volume value, and
   wherein the processor is configured to set the sound volume value based on sound characteristics of the contents, and change the sound volume value according to the first reward or the second reward.

7. The display apparatus of claim 6, wherein the processor is configured to change the sound volume value to a value at which a predicted reward is maximized.

8. The display apparatus of claim 1, wherein the sound parameter indicates a first amplification rate of voice and a second amplification rate of a background sound for sound rendering, and
   the processor is configured to set the second amplification rate of the background sound based on sound characteristics of the content, and change the second amplification rate of the background sound and the first amplification rate of the voice according to a reward obtained by the user input.

9. The display apparatus of claim 8, wherein the processor is configured to predict the reward based on a first change of the first amplification rate of the voice and a second change of the second amplification rate of the background sound, and change the first amplification rate of the voice and the second amplification rate of the background sound to values at which a predicted reward is maximized.

10. An audio output method comprising:
    receiving content from content sources;
    generating sound data by decoding the content;

setting a sound parameter;

changing the sound parameter according to reinforcement learning related to the sound parameter;

converting the sound data into a sound signal according to the changed sound parameter; and outputting sound corresponding to the sound signal;

identifying whether a user input to change the sound parameter is received after outputting the sound;

processing a first reward based on the user input to change the sound parameter being received after outputting the sound, and processing a second reward which is greater than the first reward based on the user input to change the sound parameter not being received for a predetermined time after outputting the sound.

11. The method of claim 10, wherein the changing the sound parameter includes changing the sound parameter according to an acquired reward corresponding to the first reward or the second reward.

12. The method of claim 11, wherein the changing the sound parameter comprises changing the sound parameter to a value at which a predicted reward is maximized.

13. The method of claim 11, wherein the changing the sound parameter includes changing the sound parameter immediately after the user input is inputted, or changing the sound parameter immediately after a display apparatus is turned on.

14. A non-transitory computer readable recording medium having embodied thereon a program, which when executed by a processor, causes the processor to control execution of a method, the method including:

receiving content from content sources;

generating sound data by decoding the content;

setting a sound parameter;

changing the sound parameter according to reinforcement learning related to the sound parameter;

converting the sound data into a sound signal according to the changed sound parameter; and outputting sound corresponding to the sound signal;

identifying whether a user input to change the sound parameter is received after outputting the sound;

processing a first reward based on the user input to change the sound parameter being received after outputting the sound, and processing a second reward which is greater than the first reward based on the user input to change the sound parameter not being received for a predetermined time after outputting the sound.

* * * * *